United States Patent
Battlogg et al.

(10) Patent No.: US 10,054,186 B2
(45) Date of Patent: Aug. 21, 2018

(54) MAGNETORHEOLOGICAL TRANSMISSION APPARATUS

(71) Applicant: INVENTUS ENGINEERING GMBH, St. Anton I.M. (AT)

(72) Inventors: Stefan Battlogg, St. Anton I.M. (AT); Gernot Elsensohn, St. Anton I.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 103 days.

(21) Appl. No.: 14/637,471

(22) Filed: May 20, 2015

(65) Prior Publication Data

US 2015/0247548 A1 Sep. 3, 2015

Related U.S. Application Data

(63) Continuation of application No. PCT/EP2013/002659, filed on Sep. 4, 2013.

(30) Foreign Application Priority Data

Sep. 4, 2012 (DE) ........................ 10 2012 017 423

(51) Int. Cl.
*F16F 9/53* (2006.01)
*F16D 37/02* (2006.01)
(Continued)

(52) U.S. Cl.
CPC .............. *F16F 9/535* (2013.01); *F16D 37/02* (2013.01); *F16F 9/103* (2013.01); *F16F 9/368* (2013.01); *H01F 1/44* (2013.01)

(58) Field of Classification Search
CPC .......... F16F 13/30; F16F 13/305; F16F 9/535; F16F 15/03
See application file for complete search history.

(56) References Cited

U.S. PATENT DOCUMENTS

| 4,351,515 A | 9/1982 | Yoshida |
| 4,898,480 A | 2/1990 | Raj et al. |
(Continued)

FOREIGN PATENT DOCUMENTS

| DE | 102010055833 A1 | 3/2012 |
| DE | 102011009405 A1 | 7/2012 |
| EP | 1025373 B1 | 4/2005 |

*Primary Examiner* — Vishal R Sahni
(74) *Attorney, Agent, or Firm* — Laurence A. Greenberg; Werner H. Stemer; Ralph E. Locher

(57) ABSTRACT

A transmission apparatus has two components that move in translation relative to one another and a coupling gap between the components containing a magnetorheological medium. The gap is formed and sealed outwardly at first and second ends so that the magnetorheological medium remains in the coupling gap as a sort of controllable friction lining, irrespective of a coupling between the components, in accordance with the magnetic field applied in the coupling gap. One of the components has plurality of radially extending arms that carry a magnetic field generation device. Each magnetic field generation device has an electric coil with a least one winding extends completely beside the central axis and at a distance therefrom. Different poles of the magnetic field generation devices are provided at the adjacent ends of adjacent arms of a component. The coupling gap is connected to a reservoir of magnetorheological medium.

16 Claims, 4 Drawing Sheets

(51) Int. Cl.
  *F16F 9/36*   (2006.01)
  *F16F 9/10*   (2006.01)
  *H01F 1/44*   (2006.01)

(56) References Cited

U.S. PATENT DOCUMENTS

| | | | |
|---|---|---|---|
| 6,394,239 B1 | 5/2002 | Carlson | |
| 7,870,939 B2* | 1/2011 | Steinwender | F16D 37/02 |
| | | | 192/21.5 |
| 8,844,914 B2* | 9/2014 | Kim | F16F 1/361 |
| | | | 188/267.2 |
| 8,967,343 B2* | 3/2015 | Battlogg | B62K 25/04 |
| | | | 188/266.2 |
| 2002/0084157 A1* | 7/2002 | Oliver | F16F 9/537 |
| | | | 188/267 |
| 2010/0231069 A1* | 9/2010 | Liao | H02K 7/1025 |
| | | | 310/77 |
| 2012/0186922 A1 | 7/2012 | Battlogg et al. | |
| 2013/0175132 A1 | 7/2013 | Battlogg | |

* cited by examiner

MAGNETORHEOLOGICAL TRANSMISSION APPARATUS

BACKGROUND OF THE INVENTION

Field of the Invention

The present invention relates to a magnetorheological transmission apparatus. Two components capable of being coupled, which are arranged so as to be linearly movable relative to one another, can be coupled to one another by means of such a magnetorheological transmission apparatus. The coupling is established via a magnetorheological medium, which is acted on by a magnetic field via a magnetic field generation device.

Various transmission apparatuses, such as dampers, are known in the prior art, in which the movement of two components relative to one another is damped. To this end a piston-cylinder system is often used, in which a piston is moved back and forth in a damper chamber filled with a magnetorheological fluid, whereby the magnetorheological fluid flows from one chamber side to the other and in so doing is damped in a central damping gap of the piston or in a damping gap along the periphery of the piston. For damping, the damping gap is acted on by a magnetic field of desired strength, such that the magnetorheological particles form a chain accordingly in the magnetorheological fluid. Depending on the applied magnetic field, the flow resistance of the magnetorheological fluid through the damping gap thus rises.

US 2002/0084157 A1 discloses a magnetorheological damper with a piston and a housing, which surrounds the piston. The piston separates the housing into two damper chambers, which are interconnected via an annular and controllable flow channel between the piston and the housing. The piston cooperates with the flow channel and the housing as a valve, which controls the flow of the magnetorheological fluid through the flow channel depending on the acting magnetic field. The core of the piston has radially outwardly protruding arms, around each of which a coil is wound. The generated magnetic field passes outwardly through the flow channel and is closed via a housing connected to the piston and housing that also moves with the piston, such that the flow of the magnetorheological fluid can be controlled by a corresponding magnetic field. The damper contains a large volume of the magnetorheological fluid. The volume is determined via the provided stroke multiplied by the cross-sectional area of the piston.

Both the quantity of the magnetorheological fluid and the costs incurred as a result are thus high. The volume cannot be reduced arbitrarily, since the magnetorheological fluid must absorb the damping energy. Such a damper is therefore unsuitable for applications in which economical, small and lightweight dampers are required.

Magnetorheological dampers of this type function satisfactorily. They enable high damping rates and a finely tuned damping. A disadvantage however is that the entire damping chamber has to be filled with magnetorheological fluid, which is relatively costly. This results in high production costs, which in many cases of application exceed the price limit. A further disadvantage of such damper systems is that the flow resistance of the hydraulic system per se is already highly dependent on the speed of the components moving relative to one another. The basic damping of the system becomes considerably greater with increasing relative speed. The basic damping of the system is determined by the mechanical properties of the damper without applied magnetic field. The greater the speed, the greater is the hydraulic resistance of the magnetorheological fluid as it flows through the damping gap. At higher flow rates, only damping rates that lie above the basic damping can thus be set, which narrows the field of use.

EP 1 025 373 B1 discloses a damper that requires a significantly lower quantity of magnetorheological fluid. The damper does not have a valve through which a magnetorheological fluid flows, but works as a shear damper, in which a stationary magnetorheological fluid is provided as controllable medium in an annular gap sealed at the ends. An electric coil is wound annularly around the piston rod in order to generate a controllable magnetic field. The magnetic field passes at the ends of the piston radially through the annular gap provided with the magnetorheological fluid. The ferromagnetic particles in the magnetorheological fluid are cross-linked there accordingly and thus generate a certain and significant shear force. A movement of the piston relative to the damper housing is thus damped. The piston, however, does not divide a damper chamber filled with a magnetorheological fluid into two sub-chambers, but may be open to the surrounding environment on both sides. Due to the small volume of the annular gap, the required quantity of magnetorheological fluid is much smaller than in the case of a damper that influences a flow of a magnetorheological fluid through a flow channel. The costs for the damper are thus also low, since magnetorheological fluids are relatively costly. A disadvantage of this damper, however, is that the shear force that can be generated is relatively low. Since only the regions at the ends of the annular gap contribute to the increase of the shear force, the diameter must be enlarged or a number of coils must be provided axially distanced from one another so that the magnetic field penetrates the annular gap at a number of positions and leads to a local formation of a chain by the particles in the MRF. However, even with such measures only a small part of the annual gap is used, and therefore the shear force that can be generated is very limited.

BRIEF SUMMARY OF THE INVENTION

The object of the present invention is therefore to provide a magnetorheological transmission apparatus which can be constructed economically and enables higher damping forces and with which in particular the basic damping is less dependent on speed.

This object is achieved by a transmission as claimed. Preferred developments are specified in the dependent claims. Further advantages and features of the present invention will emerge from the general description and the description of the exemplary embodiments.

A transmission apparatus according to the invention comprises at least two components capable of being coupled, which move in translation relative to one another. At least one coupling gap extends between the components between a first and a second end. The coupling gap is provided with a magnetorheological medium. At least one magnetic field generation device for generating at least one magnetic field in at least part of the coupling gap is provided in order to influence a coupling between the components capable of being coupled. The coupling gap is formed and sealed outwardly in the direction of translation at the first end and at the second end in such a way that the magnetorheological medium remains in the coupling gap as a sort of controllable friction lining, irrespective of a coupling between the components capable of being coupled, in order to influence the coupling via shear forces between the components capable of being coupled, in accordance with the magnetic field applied in the coupling gap. A plurality of arms extending at least partially radially is provided on at least one of the components, at least part of each of said arms being equipped with at least one magnetic field generation device, each magnetic field generation device comprising at least one electric coil with a least one winding, each winding extending completely beside the central axis and at a distance from the central axis. Different poles of the magnetic field generation devices are provided at the adjacent ends of adjacent arms of at least one component. The coupling gap is in particular connected to at least one reservoir of magnetorheological medium.

The transmission apparatus according to the invention has many advantages. A considerable advantage of the transmission apparatus according to the invention lies in the fact that only little magnetorheological medium is required. In contrast to the prior art, a magnetorheological medium where appropriate is required only within the coupling gap in the case of the transmission apparatus according to the invention. It is not necessary for a cylinder to be filled completely with a magnetorheological medium, within which cylinder a piston for example moves in the longitudinal direction. In accordance with the invention only the coupling gap is filled with a magnetorheological medium, where appropriate. The magnetorheological medium forms a type of friction lining within the coupling gap, which can be controlled by a magnetic field of a least one magnetic field generation device. The friction lining is activated as appropriate in accordance with the strength of the magnetic field. It is not necessary to move any component part in order to control the coupling intensity. It is sufficient to set a desired magnetic field strength.

A quickly acting system is thus achieved, in which a coupling can be attained within milliseconds between the components capable of being coupled. The strength of the coupling is dependent here in practice not on the speed of the two components capable of being coupled relative to one another in the direction of translation, but on the strength of the acting magnetic field. Since the magnetorheological medium does not have to be pushed through a gap, the strength of the coupling is less dependent on the relative speed compared with the prior art. A basic damping that is given by the hydraulic resistance of a damping medium pushed through a damping gap is absent in the case of the present invention. The coupling, in the direction of translation or in the longitudinal direction along the central axis, of the two components capable of being coupled or of the least two components capable of being coupled is established via shear forces within the least one coupling gap.

Here, the magnetorheological medium remains within the coupling gap preferably substantially without movement. The magnetorheological medium is provided substantially in a stationary manner in the coupling gap, where it forms the friction lining.

The magnetorheological medium acts without displacement within the coupling gap via shear forces. Since the magnetorheological medium has no or at least substantially almost no speed relative to at least one component capable of being coupled, the dependency of the coupling intensity on speed is significantly reduced.

Due to the arrangement of the electric coils in such a way that each winding extends transversely to the longitudinal axis of the coupling gap, the magnetically active region of the coupling gap can be significantly enlarged compared to an electric coil of a damper according to EP 1 025 373 B1, in which the winding of the electric coil extends around the piston rod. There, the annual coupling gap is penetrated only in a locally delimited manner by magnetic field lines of considerable strength. By contrast, with the invention practically the entire area of the coupling gap can be used to generate a considerable shear force. A high damping force can be produced in accordance with the invention with small overall volume and only little MRF.

A further considerable advantage of a transmission apparatus according to the invention is that, in contrast to the prior art, there is no need to provide a compensation volume for the medium displaced by the piston rod as said rod drives into the cylinder.

Due to the low overall volume of the magnetorheological medium, the temperature balance is much simpler, whereby all measures for compensation of volume changes by temperature fluctuations are intended.

A reservoir of magnetorheological medium offers considerable advantages. Only a very low quantity of MRF is contained in the coupling gap. The tolerances are preferably low and the gap dimensions are also minimal. During the course of the service life there may be a loss of MRF. This is generally not a problem in dampers that operate in valve mode, i.e. through which MRF flows, since in this case a large quantity of magnetorheological fluid (MRF) is already provided on the whole. By contrast, in the case of the transmission apparatus according to the invention, which can also be referred to or defined as a shear damper, even small losses of 0.2 or 0.5 ml MRF result in a significant relative loss of 5%, 10% or even 20%. It has therefore been found surprisingly that a reservoir can significantly increase functionality and service life.

The applicant reserves the right to claim separate protection for a further transmission apparatus according to the invention, such a transmission apparatus comprising at least two components capable of being coupled, which are movable in translation relative to one another and move in translation relative to one another. In particular the components move along a central axis. At least one coupling gap containing at least one magnetorheological medium is provided at least in part between the components. The coupling gap extends in particular in the direction of translation between a first and a second end. At least one magnetic field generation device for generation of at least one magnetic field in at least part of the coupling gap is provided in order to influence a coupling between the components capable of being coupled. The coupling gap is formed and is sealed outwardly in the direction of translation at the first end and at the second end in such a way that the magnetorheological medium remains in the coupling gap as a sort of controllable friction lining, irrespective of a coupling between the components capable of being coupled, so as to influence the coupling via shear forces between the components capable of being coupled, in accordance with the magnetic field applied or acting in the coupling gap.

In all embodiments of the invention it may be sufficient in simple variants to afford some play to the seals in the movement direction so as to be able to compensate for the volume change of the magnetorheological medium over a large temperature range. Here, this play is not effective in the direction of movement or only insignificantly affects the transmission behavior of the transmission apparatus, since the force is transmitted by the medium in the coupling gap. The volume provided by such play may be less than 5% and in particular less than 1% and preferably less than 0.5% of the volume of the coupling gap.

Similarly, inclusions of air in the magnetorheological medium, which for example are practically unavoidable as a result of the manufacturing process or as a result of ageing via small leaks, have only an insignificant effect compared to the prior art.

A magnetic field generation device is in particular formed as a magnetic field source or comprises at least one such magnetic field source. A magnetic field generation device can also be referred to as a magnet device.

A plurality of arms extending at least partially radially is preferably provided on at least one of the components. At least part of each of said arms is equipped with at least one magnetic field generation device, each magnetic field generation device comprising at least one electric coil with at least one winding, and each winding extending completely beside the central axis and at a distance from the central axis, different poles of the magnetic field generation devices being provided at the adjacent ends of adjacent arms of at least one component, and the coupling gap being connected to at least one reservoir of magnetorheological medium.

With the transmission apparatus according to the invention, the heat may be dissipated outwardly via the housing.

The magnetorheological medium provided in the coupling gap preferably without displacement and particularly preferably without rolling elements forms a chain practically immediately in the event of application of a magnetic field and acts via shear forces on the components capable of being coupled. A quick response speed is thus achieved. The coupling is effective over practically the entire area of the coupling gap directly following application or generation of a magnetic field. The magnetorheological medium, in contrast to the prior art, does not first have to be aligned when it runs into a gap in order to transmit the coupling force. A particularly quick and effective efficacy is thus attained.

In addition an interruption of the magnetic field is immediately effective, since the chain formed by the individual particles within the magnetorheological medium is immediately annulled. Particularly quick switching reactions can thus be attained.

At least one component capable of being coupled preferably at least partially surrounds at least one other component capable of being coupled. To this end, one component is preferably formed as an outer component and another component is preferably formed as an inner component. The coupling gap is preferably annular and extends in particular in the form of a cylinder shell between the first axial end and the second axial end.

It is possible that the coupling gap is formed peripherally around one component. Here, it is possible that the coupling gap for example surrounds the inner component peripherally. It is also possible that the coupling gap is formed peripherally in the outer component. It is also possible that a number of coupling gaps on the whole surround the outer and/or inner components peripherally or almost peripherally.

In all embodiments it is preferable that the components are arranged axially displaceably relative to one another. By way of example it is possible that the outer component slides as a sort of sliding shoe or the like on a cylindrical inner component. It is also possible that a component is arranged in a piston-like manner within a cylinder construction. The surfaces sliding relative to one another can be precision turned, sanded, honed, polished and/or provided with friction-reducing coatings, for example with Teflon, molybdenum, plasma layers, etc.

The transmission apparatus can be used in practice as a shear damper. The magnetorheological medium acting as a switchable friction lining on the coupling gap enables the use as a damper. The adaptive force a change is based here are not on the generation of pressure or pressure differences on both sides of a piston, but instead the adaptive force change is based on the controlled effect of the friction lining via shear forces. Even at higher load or force, practically no significant pressure is thus produced on the seals or sealing lips, which reduces the friction.

The magnetorheological medium responsible for the force variation causes only an irrelevant speed-dependent force change as the two components move in translation relative to one another. By contrast, magnetorheological dampers in which the magnetorheological fluid flows through a piston have significant hydraulically induced force changes at different speeds, since, due to the flow of a magnetorheological fluid through a narrow point, speed-dependent pressure differences are built up on account of the fluid friction.

The magnetorheological medium may be formed for example as a magnetorheological fluid or may comprise at least one such fluid, in which small ferromagnetic particles are distributed for example in an oil or the like. However, it is also possible that for example finely distributed ferromagnetic particles are mixed in a grease as magnetorheological medium. By way of example, carbonyl iron powder particles can be mixed with grease. Glycol, grease and viscous substances can also be used as carrier medium, without limitation thereto. The carrier medium may also be gaseous, or the carrier medium can be omitted. In this case only particles that can be influenced by the magnetic field are filled into the channel.

Magnetorheological elastomers (MREs), i.e. composite material of magnetically polarizable particles in soft elastomer matrix, are also possible. Such magnetorheological elastomers may form a solid coating, which remains on the coupling gap even without seals or the like.

The ferromagnetic particles preferably consist at least in part and in particular at least practically completely of carbonyl iron powder, the size distribution of the particles being dependent on the specific use. Specifically, a distribution of the particle size between one and ten micrometers is preferred, larger particles of twenty, thirty, forty and fifty micrometers also being possible however. Depending on the application, the particle size may be much greater and may even enter the millimeter range (particle spheres). The particles may also have a special coating/casing (titanium coating, ceramic casing, carbon casing, etc.). For this application the particles can be produced not only from carbonyl iron powder (pure iron), but for example also from special ferromagnetic alloys. The particles may each have coatings.

In preferred embodiments at least one spring device is provided in order to build up a counterforce when the two components are deflected in at least one direction. Here, the spring device may be part of the transmission apparatus. However, it is also possible that the spring device is provided separately outside the transmission apparatus and on the whole is part of a superordinate apparatus.

The magnetic field generation device particularly preferably has at least one electric coil with at least one winding. Here, it is particularly preferable that the winding extends completely beside the central axis and at a distance from the central axis. The winding or the area defined by the winding particularly preferably does not intersect the central axis. In particular, the electric coil of the magnetic field generation device generates a magnetic field transversely to the movement of the two components relative to one another. The electric coil is preferably operated with small voltages. In the case of a plurality of electric coils, the same is preferably true for each individual coil.

The magnetic field generation device may comprise at least one permanent magnet or at least one electric coil or an arbitrary combination of permanent magnets and electric coils. Here, the reciprocal influence of the generated magnetic fields to form a common magnetic field acting in the coupling gap on the magnetorheological medium is possible and is expressly desirable. A possible application of such a construction, due to the static magnetic field of the permanent magnets in the event of a movement of the components relative to one another, generates a basic force, which can be attenuated or intensified by the magnetic field of the electric coil changeable in real time.

In accordance with particular embodiments the magnetization of the permanent magnet can be changed in the long-term by individual magnetic pulses of the electric coil. A construction of this type requires only energy for adjustment and can hold the respective set state currentlessly in the long term, which enables the construction of very economical systems.

Hard-magnetic materials, such as various iron alloys or rare earths, such as AlNiCo, SmCo, ferrite and the like, are particularly well suited as changeable magnets.

In a preferred and easily embodied development, the electric coil is oriented in a plane parallel to the central axis and generates a magnetic field, which intersects the central axis. Such an embodiment has the advantage that the size of the electric coil and therefore the area of the magnetic field acting on the coupling gap is independent of a diameter of the components capable of being coupled.

If an outer component that for example is cylindrical, oval or elliptical surrounds an accordingly formed inner component and both components are movable relative to one another in the longitudinal direction, an electric coil of this type can effectively act on a coupling gap. Due to the selection of a suitable length of the coupling gap in the movement direction, the magnitude of the action and therefore the coupling intensity can be influenced. If, for example, the strength of the coupling intensity is insufficient due to construction, the effective area of the coupling gap can be enlarged in a simple manner. A plurality of such electric coils and/or coupling gaps can be provided in a peripheral direction.

A plurality of magnetic field generation devices is provided in preferred developments.

At least one component preferably has a plurality of arms extending at least partially radially. At least part of each arm is equipped with at least one magnetic field generation device. It is possible and preferable that the radially extending arms are distributed over the periphery of one of the components. The number of arms each equipped with a magnetic field generation device is particularly preferably an even number. Different magnetic poles at the magnetic field generation devices are particularly preferably provided at the adjacent ends of adjacent arms of at least one component.

However, it is also possible that two adjacent arms at the radially adjacent end thereof have the same poles. It is particularly preferable, however, that the arms adjacent to these arms have a different pole orientation.

Due to such an embodiment it is ensured that the pole orientation changes periodically in the peripheral direction. A peripheral gap provided for example on an inner or an outer component is thus divided into different sub-gaps, through each of which the magnetic field of the magnetic field generation devices passes.

In this embodiment the magnetic field is closed again preferably by the outer component. To this end, the outer component has a magnetically conductive unit or the like.

It is also possible and preferable that the magnetic field generation devices are provided on the outer component and a magnetically conductive unit is located on the inner component and reduces the magnetic resistance within the magnetic circuit.

In such embodiments an approximately star-shaped structure is provided, in which star-shaped arms protrude radially outwardly from the inner component and/or in which radial arms protrude radially inwardly from the outer component. The magnetic field lines here pass through the coupling gap between the inner and the outer component and effectively act on the coupling gap. The coupling gap, which for example is peripheral on the whole, can be divided into a plurality of coupling gaps by means of appropriate mechanical separation means, and said plurality of coupling gaps can each be acted on separately by a magnetic field from different magnetic field generation devices.

In all previous embodiments the coupling gap is sealed at both axial ends with respect to the surrounding environment. In particular the coupling gap borders the surrounding environment at both axial ends. It is possible that separate seals are provided at the two axial ends of the coupling gap in order to effectively prevent a discharge of magnetorheological medium from the coupling gap. This is then particularly advantageous if such a transmission apparatus requires maintenance rarely or is to be maintenance-free. Due to a seal of the coupling gap, the undesirable discharge of magnetorheological medium is prevented, whereby the store of magnetorheological medium within the coupling gap can be reduced.

The magnetorheological medium in the coupling gap is particularly preferably subject in a rest state substantially to ambient pressure. It is possible that the magnetorheological medium in the coupling gap is also subject in a rest state to a slight overpressure. However, a pressureless state is particularly preferred, since here the discharge of magnetorheological medium outwardly on account of pressure differences is reliably prevented.

It is possible that at least one reservoir or a storage volume of magnetorheological medium is associated with the coupling gap. By way of example, the reservoir may be connected to the coupling gap. In particular the reservoir provides between 25 and 500% of the volume of the coupling gap. Such a storage volume makes it possible to replace magnetorheological medium that has escaped during the course of operation, without the need for separate maintenance. In particularly preferred cases the volume of the reservoir is between 10% and 200% and in particular between 50 and 100% of the volume of the coupling gap. Even when a storage volume is associated with the coupling gap, a particularly low quantity of magnetorheological medium can be used on the whole. Even under consideration of the storage volume, the volume required on the whole is much lower than for example in the case of a magnetorheological damper, in which a cylinder is filled completely with a magnetorheological medium. The reservoir can also be designed such that, when switching on the magnetic field generation device, the magnetorheological fluid on account of the magnetic field is drawn into the coupling gap, which is not quite full on account of leakages or other circumstances. The reservoir is preferably designed such that the magnetorheological fluid, as a result of the position of installation and force of gravity, flows into the coupling gap, which is not quite full due to leakages or other circumstances.

In a specific embodiment only approximately 1.5 ml of a magnetorheological fluid were required. The use in applications that are price-critical is thus also made possible.

It is also possible and preferable that the coupling gap has at least one pressure compensation device. Such a pressure compensation device can be formed for example by at least one groove along the coupling gap. Upon activation of a magnetic field, the friction lining and therefore the magnetorheological medium is displaced by the shear forces in the movement direction, such that an increased pressure of the magnetorheological medium can build up at this end of the coupling gap, which pressure then leads to a corresponding loading of the seal provided there (drag flow pressure). For pressure reduction, a groove for example can be provided on the coupling gap and can lead to a pressure compensation with the other end of the coupling gap.

It is also possible that the pressure compensation device has at least one channel, which at the end of the coupling gap connects to the other end of the coupling gap or a region with lower pressure. By way of example, a bore or other through-opening can be provided on one of the components, said opening connecting an end of the outwardly closed coupling gap to the other end of the outwardly closed coupling gap. A pressure compensation can also be provided by means of such a channel. Here, it is also possible that the pressure compensation is not provided between the axial ends, but in each case is provided from an axial end to a middle region of the coupling gap.

In all embodiments it is preferable that at least one magnetic field generation device has at least one permanent magnet. A permanent magnet enables a sustained application of a magnetic field to the coupling gap in order to actively switch the friction lining in the long-term. Here, no electric current is required by the use of the permanent magnet. Such a permanent magnet for example also enables a minimum coupling between the components capable of being coupled. At least one magnetic field generation device is preferably assigned a permanent magnetic and at least one electric coil. Due to the electric coil, the magnetic field of the magnetic field generation device can be modulated, such that it can be intensified or attenuated as required. With interruption of the magnetic field, the electric coil then still applies a magnetic field of the permanent magnet, whereas with operation of the electric coil a larger and a smaller magnetic field and therefore selectively a more intensive or a weaker coupling of the components capable of being coupled is possible. A permanent magnet consists in particular at least in part and preferably completely of at least one hard-magnetic material.

In preferred developments it is possible that the magnetic field of the permanent magnet is influenced via the associated electric coil. Here, it is possible in particular that the magnetic field varies continuously and/or the electric coil is modified in the long-term via short pulses. If the magnetic field of the permanent magnet changes in the long term via short pulses of the electric coil, an effective coupling of the components capable of being coupled can be performed. Such an embodiment is advantageous since the magnetic field of the permanent magnet acting for relatively long periods of time in each case can be influenced via momentary pulses without the need for electric current during these relatively long periods of time.

In all embodiments it is preferable that the length of the inner component is greater than the diameter thereof. In particular the axial length of the coupling gap is greater than the diameter of a coupling gap that is peripheral on the whole. If a plurality of coupling gaps is provided over the periphery of the inner and/or outer component, the axial length is preferably at least one coupling gap greater than the radial diameter or the radial spacing of two coupling gaps. Such an embodiment enables a flexible design of the size of the effective coupling gap, in particular when the winding of an electric coil is oriented parallel or approximately parallel to the central axis of the component capable of being coupled. The axial length of the coupling gap thus influences the possible coupling force between the components capable of being coupled.

The axial length is particularly preferably at least twice the diameter of the inner component.

A further transmission apparatus according to the invention comprises at least two components capable of being coupled, which move in translation relative to one another, at least one coupling gap extending at least partially between the components between a first and a second end. The coupling gap is provided with at least one magnetorheological medium. At least one magnetic field generation device for generating at least one magnetic field in at least part of the coupling gap is provided in order to influence a coupling between the components capable of being coupled. Here, the coupling gap is formed in such a way and the magnetorheological medium is such that the magnetorheological medium as a sort of controllable friction lining remains in the coupling gap, irrespective of a coupling between the components capable of being coupled, and influences the coupling between the components capable of being coupled via shear forces, in accordance with the magnetic field applied in the coupling gap.

This transmission apparatus according to the invention also has many advantages. The transmission apparatus allows a simple and cost-effective construction.

The magnetorheological medium is held substantially within the coupling gap by the consistency of the magnetorheological medium and/or by the construction and the structure of the coupling gap.

By way of example, the magnetorheological medium may comprise an elastomer or the like in order to hold the magnetorheological medium within the provided volume. By way of example, the coupling gap can be formed with a substantially solid friction lining or with the magnetorheological medium, the "rubbing effect" being controlled by application or generation of a magnetic field.

Constructional measures in the form of seals and the like are also possible.

The transmission apparatus preferably has individual or a number of or all features of a previously described transmission apparatus.

One of the previously described transmission apparatuses is particularly preferably used in a damper or in a washing machine. Here, coupling forces in the range from 10 N (without magnetic field) to 100 N (with magnetic field), but also 200 N (with magnetic field) are preferably attained. The use in a washer dryer, as damper in vehicles, for example on the luggage compartment lid or in the engine chamber, etc., in furniture and on a prosthesis, an exoskeleton, a robot or a motor- or muscle-driven bike or the like is also possible.

An apparatus according to the invention is embodied in particular as a washing machine or the like and comprises at least one transmission apparatus, as has been described previously.

In all embodiments it is also possible that the magnetorheological medium comprises what are known as microspheres instead of oil or grease in liquid form. Such microspheres are lubricants for example with spheres 1 to 10 micrometers in size formed from a lubricating medium. An advantage of such media is that, due to their size, they are not able to penetrate well or even at all through the sealing gap of the seals. The ferromagnetic particles may also be embodied as microspheres. The encasement of the ferromagnetic particles with a material that example reduces friction is also conceivable.

These microspheres, depending on the intended use, may also be much larger than 1 to 10 micrometers. Diameters from one to several tenths of a millimeter or also greater are conceivable. It is also possible and preferable that the core consists of laminated layers. On the whole, it is possible that the coupling gap forms a sort of annular gap, which consists however of a number of channel segments. It is possible that the two components are mounted relative to one another outside the coupling gap via support rings, bearings and in particular roller bearings.

A further transmission apparatus according to the invention comprises at least two components capable of being coupled, which move in translation relative to one another, at least one coupling gap provided with a magnetorheological medium extending between the components. At least one magnetic field generation device is provided for generating at least one magnetic field in at least part of the coupling gap in order to influence a coupling between the components capable of being coupled. At least one of the two components is received with a free stroke on a coupling part, for example in the form of a rod. Such an embodiment is also very advantageous, and the applicant reserves the right to claim separate protection therefor.

The coupling part can be moved relative to the corresponding component, which can also be referred to as the receiving component, by the free stroke with only a relatively low or almost even no application of force. The coupling part can be received movably on the receiving component and can be pressed from either side toward the receiving component by a spring or a spring/damping element, such that in the unloaded state a neutral middle position is provided. Even under low load, the receiving component or the coupling part deflects as far as the free stroke. The movement can be detected and evaluated via appropriate sensors. In simple embodiments the coupling part can be formed as a rod or piston rod.

Further advantages and features of the present invention will emerge from the description of the exemplary embodiments, which will be explained hereinafter with reference to the accompanying figures.

DESCRIPTION OF THE INVENTION

Figure 1:
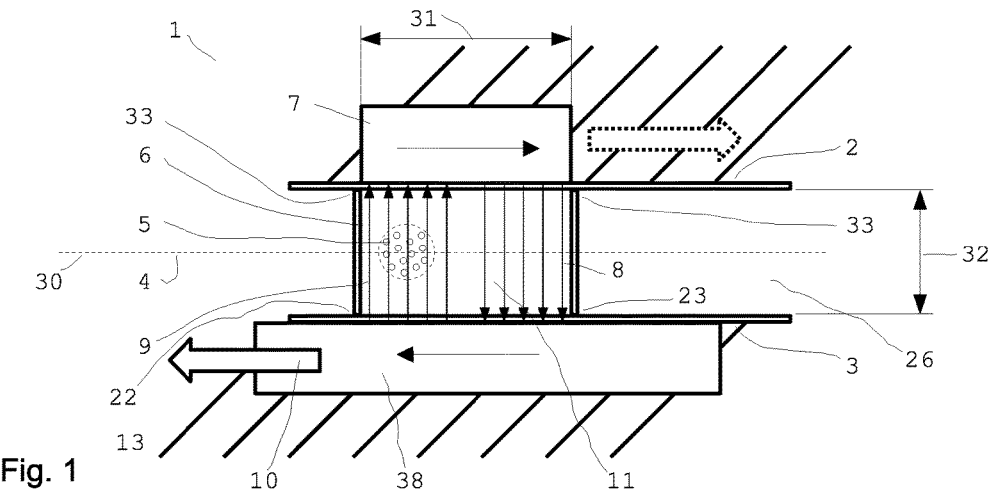
FIG. 1 shows a schematic illustration of a coupling device according to the invention.

FIG. 1 shows a highly schematically illustrated transmission apparatus 1 with a central axis 4 and two components 2 and 3 capable of being coupled, which are arranged movably relative to one another in the direction of the solid arrow 10 and the dashed arrow.

A coupling gap 6 is provided between the components 2 and 3, said gap being filled with a magnetorheological medium 5. The components 2 and 3 are plate-like here and can be moved in translation relative to one another in the direction of the central axis 4. The components 2 and 3 movable here linearly relative to one another can be coupled to one another via the controllable friction lining 9 in order to damp a relative movement.

Homogeneously distributed magnetorheological particles are contained in the magnetorheological medium 5, which for example comprises at least one magnetorheological fluid (MRF), which particles form a chain along the magnetic field lines when a magnetic field is applied. The surfaces with which the chain ends of the magnetorheological medium have contact can preferably be rough, can have zigzag or sawtooth patterns, or can have other structures increasing the contact force or coupling force. Such surfaces are particularly preferably used only in areas over which no seal slides during operation. The magnetorheological medium 5, however, may also comprise grease as carrier medium, in which magnetorheological particles are distributed, The magnetorheological medium 5 in the coupling gap 6 serves on the whole as a controllable friction lining 9, which can be switched on or controlled by applying or by generating a magnetic field 8.

Following the action of a magnetic field 8, the magnetorheological particles forming a chain in the field direction cause a coupling of the two components 2 and 3. In order to displace the component 2 or 3 relative to the other component for example, a shear force must be applied, which overcomes the acting force of the magnetorheological particles. Here, the magnetorheological medium 5 remains substantially stationary within the coupling gap 6 and is not pressed through a gap in order to dampen a movement. The magnetorheological medium remains displacement-free in the outwardly sealed coupling gap 6 during the movement of the two components relative to one another. A particularly quick reaction capability of the magnetorheological fluid is thus ensured, since, following a first chain formation of the magnetorheological particles with one another, no further reaction time is required in order to apply the shear force to the two components 2, 3.

By contrast, in conventional magnetorheological dampers a magnetorheological fluid is pushed through a damping gap. With the flow movement of the magnetorheological particles, these must each be aligned with one another and arranged in the form of a chain upon entry into the damping gap. Particularly at high flow rates, the particles may cross through an area of, or the entire damping gap before the chain formation and thus the full force development is complete. By contrast, the coupling gap according to the present invention acts practically immediately and over the entire length thereof. The coupling gap 6 remains on the whole free from interfering bodies and in particular free from rolling elements, also in order to ensure a rapid response and release of the components capable of being coupled.

A cross section 11 of the coupling gap 6 remains substantially constant in the movement direction, but may also be formed otherwise.

The coupling gap 6 extends from a first axial end 22 to a second axial end 23 and is sealed outwardly via seals 33. Possible seal types, without limitation, are: O-rings, quad-ring seals, Waveseal, scrapers or seals with a friction-optimized sealing lip design. These may also be provided with friction-reducing coatings, for example with PTFE or fillers formed from graphite, glass fibers, etc. Seals made of a permanent magnet material are also possible.

In addition, a scraper or filter element can be arranged upstream of the actual seal 33 in order to keep the ferromagnetic particles of the magnetorheological medium 5 away from the seal, at least to a large extent.

In order to generate a magnetic field 8, at least one magnetic field generation device 7 is used. The magnetic field generation device 7 may comprise for example a permanent magnet 27, but a magnetic field can also be generated via an electric coil 17.

The coupling force between the two components 2 and 3 is influenced by the area of the coupling gap 6, the medium 5 and by the applied magnetic field 8. In order to increase the coupling force, the area of the coupling gap 6 on which a magnetic field acts may therefore be enlarged.

Here, the surrounding environment 26 is provided outside the coupling gap 6, such that the seals 33 of the coupling gap 6 seal with respect to the surrounding environment 26. There must not be a pressure difference between the two sides of the component 3.

Figure 2:
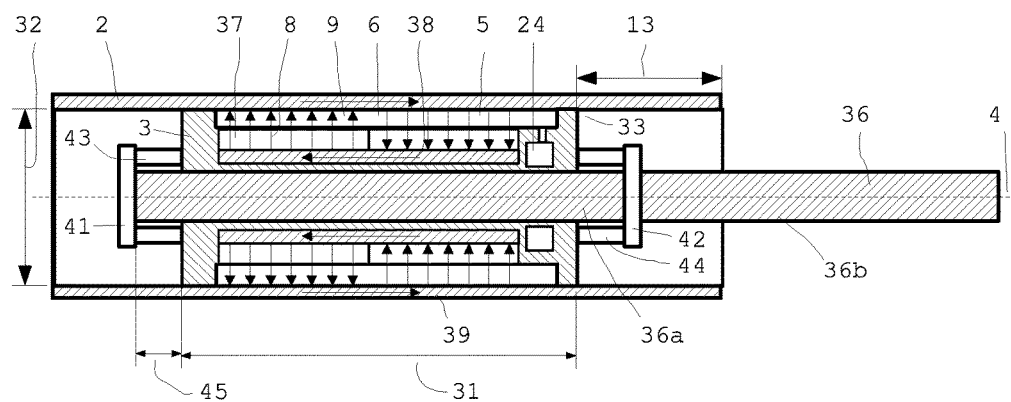
FIG. 2 shows a further coupling device according to the invention.

FIG. 2 shows a further exemplary embodiment of a transmission device 1 according to the invention, which here is substantially rotationally symmetrical.

The inner component 3 is arranged within the outer component 2 to so as to be displaceable in translation and here axially in the translation direction 30. Here, the coupling gap 6 is provided on the inner component 3 and borders the inner peripheral surface of the outer component 2.

By applying or generating a magnetic field 8 in the coupling gap 6, the friction lining 9 is activated and couples the two components 2 and 3 to one another.

Since the magnetorheological medium 5 is arranged without displacement in the coupling gap 6 and here substantially without movement relative to the inner component 3, the magnetorheological medium acts as friction lining 9 when a magnetic field 8 is applied. Here, coupling strength of the two components 2 and 3 is dependent on the magnetic field strength and on the area of the coupling gap 6 on which the magnetic field 8 acts. The coupling strength, by comparison with a structure according to the prior art, is practically independent of a speed at which the components 2 and 3 move relative to one another. An increasing coupling or damping due to the fact that a hydraulic oil must pass through a gap is absent in the case of the transmission apparatus 1.

A further considerable advantage is that the volume of the coupling gap 6 is low on the whole compared to the volume of the component 2 or the component 3. Only little magnetorheological medium is thus required, which lowers the production costs.

Should magnetorheological medium 5 escape through the seals 33 during operation, a volume compensation of the magnetorheological medium 5 can be performed via a reservoir 24. Such a volume compensation 24 can be provided for the service life of the transmission apparatus 1. By way of example, the volume compensation 24 can be dimensioned such that sufficient magnetorheological medium is available for a service life of one or two or five, ten or twenty years. So that a post-lubrication is ensured at any time, the reservoir 24 can be spring-loaded or loaded with a slight overpressure, such that an appropriate quantity of magnetorheological medium 5 is conveyed into the coupling gap 6 following a discharge of magnetorheological medium 5 from the coupling gap 6 outwardly.

Here, a rod 36 is provided along the central axis 4 and is connected to the inner component 3. In accordance with a structure according to the prior art, the components 2 and 3 movable relative to one another correspond to the cylinder or piston and the rod 36 of the piston rod.

The magnetic field 8 is generated by the magnetic field generation device 7, which for example has permanent magnets 37. The magnetic field passing through the coupling gap 6 is guided through the magnetically conductive component 2, passes again through the coupling gap 6, and is returned and closed in the interior of the component 3 by a ferromagnetic core 38. The component 2 can be magnetically conductive on the whole or has a magnetically conductive ring 39 for closing the field.

Instead of the illustrated permanent magnet 37, the magnetic field can also be generated by at least one electric coil 17. It is advantageous if the coil is wound on the core 38 around the central axis of rotation 4, ferromagnetic pole pieces guiding the generated magnetic field 8 radially outwardly to the coupling gap 6 laterally from the coil in this section.

Figure 3A:
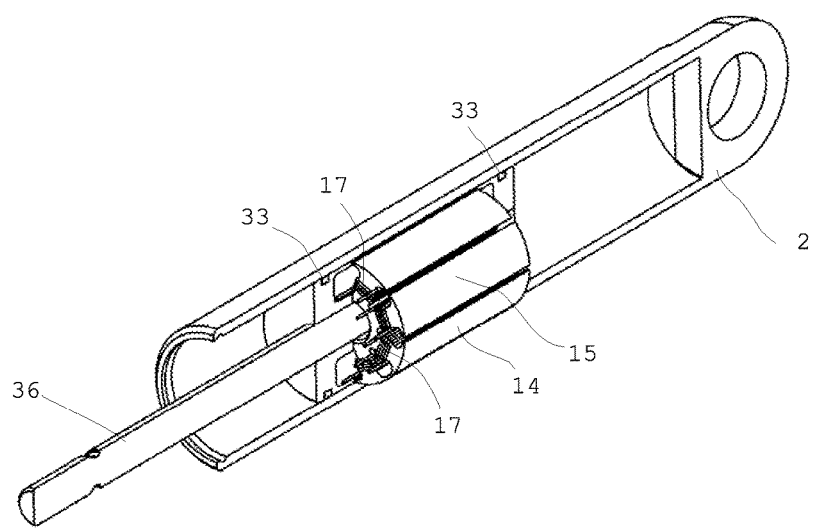
FIG. 3A shows a further coupling device illustrated perspectively in half section.
Figure 3B:
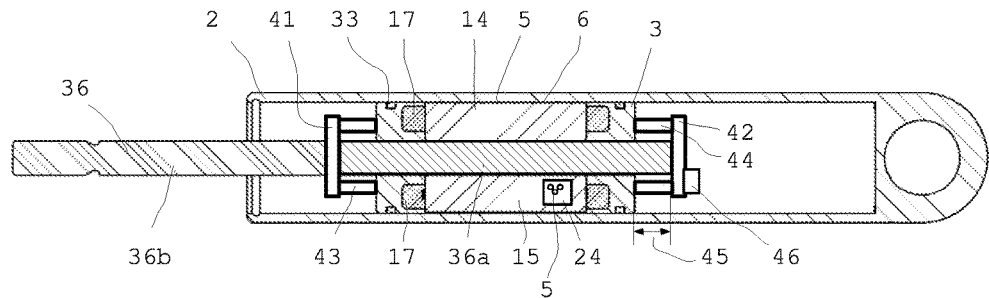
FIG. 3B shows a variant of the coupling device according to the invention according to FIG. 3B in section.
Figure 3C:
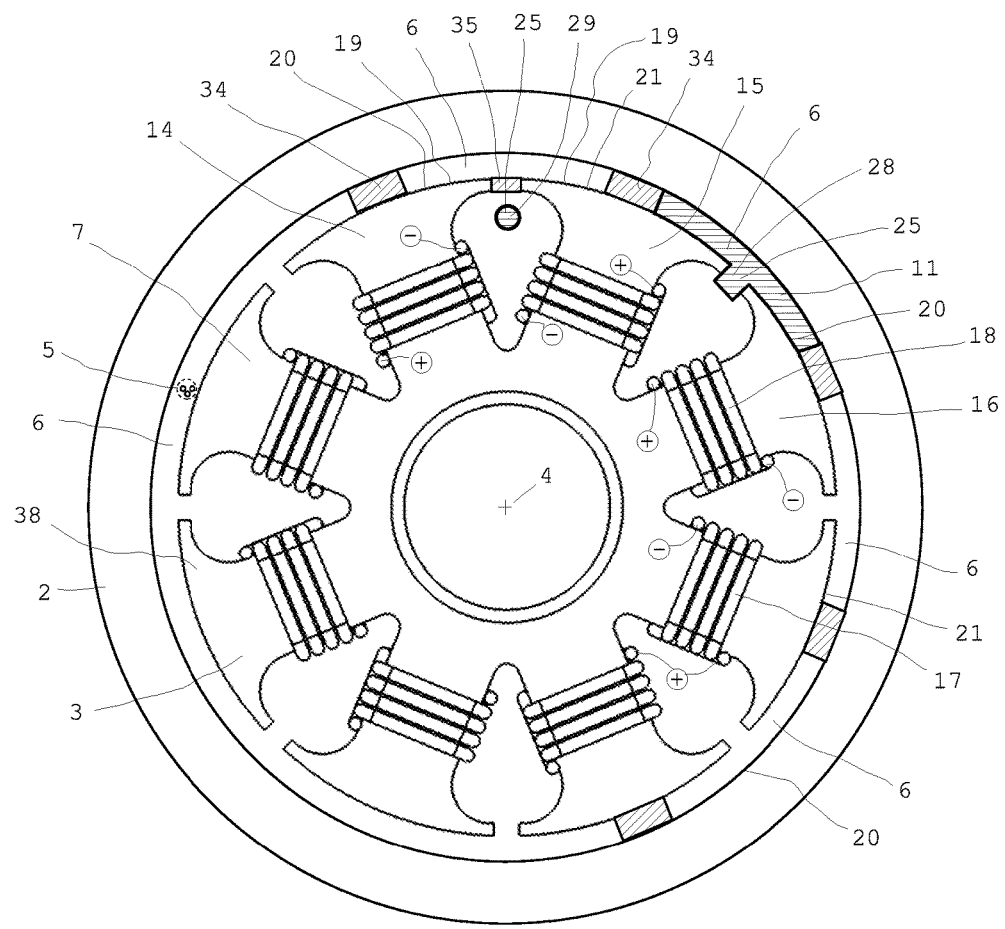
FIG. 3C shows a schematic cross section through the coupling device according to the invention according to FIG. 3B or 3C.

The transmission device 1 may have a free stroke 45 when the illustrated stops 41 and 42 are provided and the axis 36 is not fixedly connected to the component 3, but is decoupled from the component 3 via the spring devices 43 and 44 by the free stroke 45 or at most twice the free stroke 45. A lower basic force is thus made possible, which for example is of considerable advantage in the case of load detection of washing machines. A large switchable working range and low costs are also provided. Due to such a free stroke, the piston rod 36 in the currentless state is decoupled from the component 3 and can be deflected against the settable spring force of the spring device 43 or 44, even with low effective forces. The damping can thus be decoupled from a load detection. In the normal operating state, the coil is again energized for damping, such that the piston rod 36 is coupled to the component 3 with a frictional fit or form fit caused by the acting magnetic field. Relative movements between the components 2 and 3 are then damped. FIGS. 3A, 3B and 3C show preferred embodiments of a transmission apparatus 1, in each case in section. The transmission apparatus 1 here in each case has cylindrical outer and inner components 2 and 3. The inner component 3 is provided about the central axis 4 and has arms 14, 15 and 16 protruding outwardly approximately in a star shape. Widened portions that are approximately T-shaped in cross section are provided at the end of 19 of each of the arms 14 to 16 and serve on the whole or as poles of a magnetic field generation device 7 or as a plurality of poles of different magnetic field generation devices 7.

Whereas in FIG. 3A a perspective partially cut illustration of a transmission apparatus 1 is illustrated, FIG. 3B shows a cross section. The embodiments according to FIG. 3A and FIG. 3B are structured identically in principle. One difference, however lies in the fact that the transmission apparatus 1 in FIG. 3B has a free stroke 45, as has been described with reference to FIG. 2. Such a free stroke enables a reliable function, in particular when a low basic friction is required.

FIG. 3B additionally also shows a reservoir 24 in order to compensate for magnetorheological medium 5 which should escape through the seals 33 with long-term operation.

For the use on apparatuses that carry out a load detection, such as a load detection in the case of a washing machine, a very low basic force is required in order to perform the load detection. For the load detection, in the case of a washing machine, the drum suspended by means of springs must move dependently of the load mass, a sensor measuring the path of displacement. Excessive friction in the dampers prevents a movement of the drum and therefore the measurement. It has been possible to minimize the basic force by a free stroke. Here, the piston rod is held in the middle relative to the piston by means of relatively weak spring/damper elements 42, 43. The force to move the rod 36 is low and is less than 20 N when both components 2 and 3 are arranged relative to one another. When a magnetic field is switched on the magnetic field attracts the road 36 and fixes this, whereby the damping is then generated adaptively via the MRF shear gap.

The piston rod can also be fixed relative to the piston by a mechanical bolt, latching mechanism, plunger coil, etc., which is actuated by the provided magnet unit or has a dedicated adjustment unit/magnetic unit.

The piston rod 36b preferably consists of a magnetically non-conductive material.

The part 36a of the piston rod 36 preferably consists of a magnetically conductive material, but may also be made alternately of magnetically conductive and magnetically non-conductive material.

A spring, a rubber part or also an MRE (magnetorheological elastomer) can be used as spring/damper element. The spring/damper element may also be expanded by a sensor (force sensor, displacement sensor).

The individual arms 14 to 16 are each surrounded by windings 18 of electric coils 17. Here, the electric coils 17 are wound and activated in such a way that the ends 19 of adjacent arms 14, 15, 16 each act alternately as north pole or south pole. Here, in the exemplary embodiment, a north pole 20 is provided at the end 19 of the arm 14, whereas on the adjacent arm 15 the end serves as south pole 21. Here, a separating unit 35 is provided between the ends 19 of the arms 14 and 15, which separating unit for example is not magnetically conductive or is only poorly magnetically conductive in order to prevent a magnetic short-circuit between the arms 14 and 15.

The coupling gap 6 can be divided over the periphery thereof by separating elements 34 into a plurality of segments. The segment between the arm 15 and the arm 16 here likewise has an approximately T-shaped cross section, since a groove 28 extends inwardly in a central region. The groove 28 can serve as a pressure compensation device 25. If the two components 2 and 3 are moved axially relative to one another whilst the magnetic field 8 couples the two components 2 and 3 to one another, the friction lining 9 or the magnetorheological medium 5 provided in the coupling gap 6 is loaded on the whole in the direction of the relative movement with a force that can also act on the seal 33 at this axial end.

For relief, a pressure compensation device 25 such as the groove 28 can be provided.

However, a pressure compensation device 25 in the form of a channel 29, which for example is formed as a bore and extends parallel to the coupling gap 6, is also possible. The channel 29 connects an axial end of the coupling gap 6 to a region distanced therefrom in order to thus enable a pressure compensation. However, the pressure compensation devices 25 do not lead to an actual flow of the magnetorheological medium, but substantially only to a pressure compensation in order to reduce or to prevent the load of the seals at the ends.

Various separating elements 34 for dividing into various peripheral segments can be provided on the periphery of the coupling gap 6. Such separating elements 34 are preferably inserted centrally above the poles so as to not to negatively influence there the coupling in the regions of a weak magnetic field.

The structure is also possible without cast coil and thus without grooves 28 or channels 29 and in particular without separating elements 34. The volume thus freed can be filled at least in part with the magnetorheological medium 5.

Figure 4:
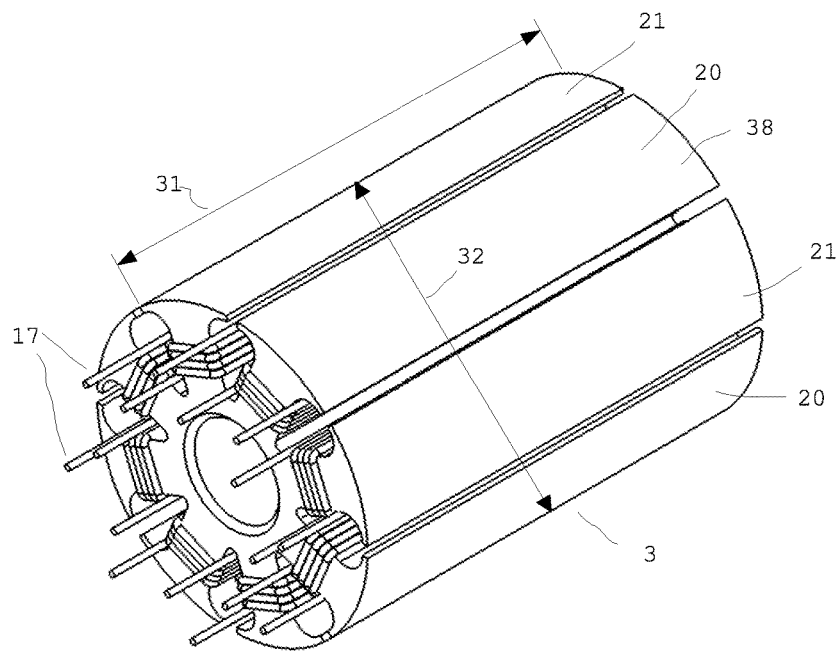
FIG. 4 shows the inner component of the coupling device according to FIG. 3C in a perspective illustration.

FIG. 4 shows a schematic perspective illustration of the inner component 3 of the coupling device 1 according to FIG. 3B or FIG. 3C. The arms 14, 15 and 16 of the component 3 extend here over the entire length of the component 3. The length 31 of the arms is preferably greater than a diameter 32 of the component 3. In particular, the length 31 may also be more than twice the diameter 32 of the component 3. Here, a total of eight arms 14, 15 and 16 are distributed regularly over the periphery, the ends each being T-shaped. The distance between the lateral ends of adjacent arms 14, 15 and 16 is preferably dimensioned such that a wire of a winding 18 can be introduced inwardly through the gap.

It is possible that the electric coils 17 are each activated individually. It is also possible that the windings 18 on the arms 14, 15 and 16 are connected on the whole to form a single electric coil 17. Here, the poles are thus interconnected as is illustrated in FIG. 3, whereby an alternating polarity results. This has the advantage that the field lines exiting from a pole do not have to be guided over half the periphery of the outer component 2, but re-enter the next pole of the adjacent arm inwardly and closely together through the coupling gap.

As a result of such a design, the coupling gap extending on the whole over the periphery is divided via the plurality of electric coils 17 into different segments.

Figure 5:
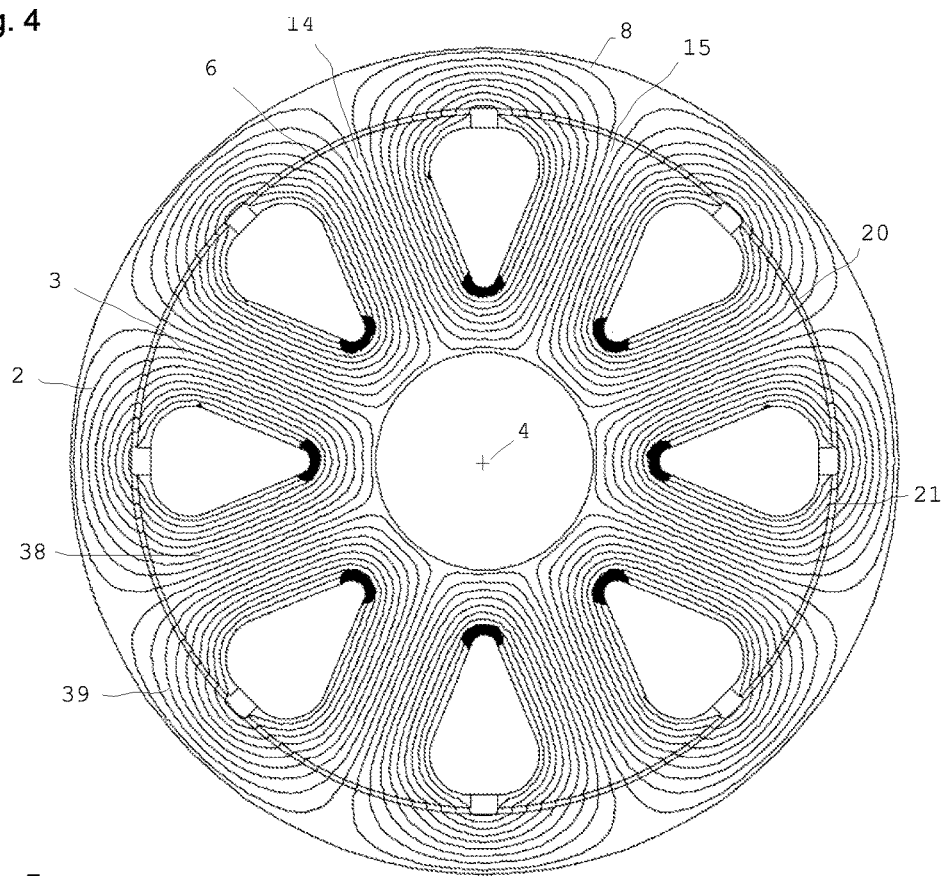
FIG. 5 shows schematically illustrated magnetic field lines in the coupling device according to FIG. 3C.

FIG. 5 shows a schematic cross section through the coupling device 1 according to FIG. 3B or FIG. 3C, magnetic field lines being illustrated by way of example.

It can be clearly seen that the magnetic field lines of the magnetic field 8 each exit radially at the individual arms 14, 15. The field lines on one side of a T-shaped pole are guided to the adjacent arm, whereas the field lines on the other side of the T-shaped pole are forwarded to the arm on the other side. A north or a south pole 20, 21 is provided alternately at the ends of adjacent arms 14, 15, and the field lines always run only over a relatively short distance through the ring 39 of the outer component 2. Depending on the number of poles, a relatively thin wall thickness of the outer component 2 can thus be made possible, since the maximum magnetic flux remains relatively low. For example, it is not necessary to guide the magnetic field around half of the inner component 3. Separating elements 34 can be provided in the areas of low magnetic field density.

Figure 6:
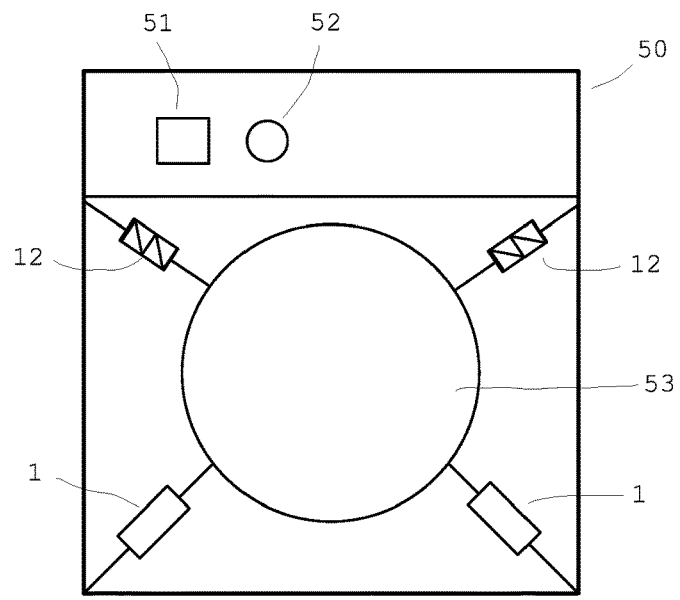
FIG. 6 shows a schematic illustration of a washing machine equipped with a coupling device according to the invention.

FIG. 6 shows a highly schematic illustration of a washing machine 50 according to the invention, which has a control device 51 and is operated with an operating unit 52.

The washing drum 53 is suspended such that it can exert vibrations. In order to damp the vibrations, two transmission apparatuses 1 and two spring devices 12 are provided here, with no limitation to these numbers. Due to the coupling devices 1 according to the invention, a simple, effective and economical damping of vibrations of the washing drama 53 is possible.

Figure 7:
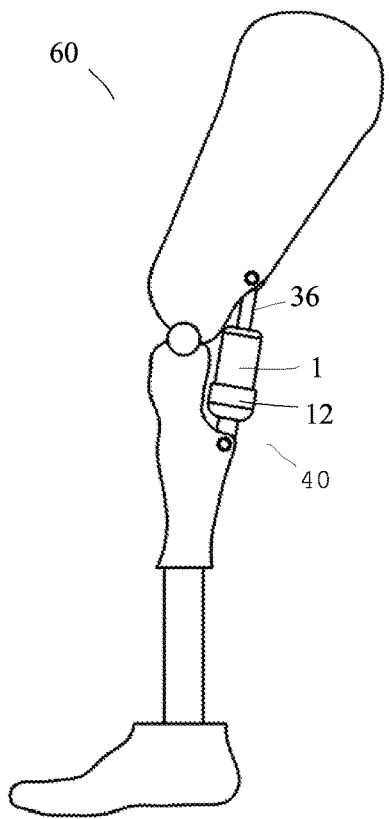
FIG. 7 shows a prosthesis with a coupling device according to the invention.

Similarly, a prosthesis 60 can also be provided with a transmission device 1, which acts as a damper 40, as illustrated in FIG. 7. Here, it is possible that both the knee joint is equipped with a transmission apparatus 1 and the foot joint is equipped with a transmission apparatus 1 acting as a damper 40.

A further field of application of a transmission apparatus according to the invention lies in robotics, where the expansion of moved systems by a controllable damping element is particularly advantageous. By way of example, a transmission apparatus 1 in series or parallel to the drive allows a higher speed, since occurring load peaks are reduced and the drivetrain can be designed more simply. For example, the force on a leg of a walking robot when a peak load occurs can thus be significantly reduced and the damping can be adapted selectively to the respective situation (speed, subsurface, etc.). Compared to conventional spring/damper systems, however, no more "softness" and instability is introduced into the drive than is required by the respective situation.

In all cases it is possible that at least one sensor is provided in order to control or to regulate the transmission apparatus with sensor signals of a sensor device via a control device. Possible sensors, without limitation thereto, are: displacement sensor, force sensor, acceleration sensor, 3D sensor.

At least one core can be multi-layered or can be formed as a laminated layer structure in order to reduce eddy current effects in the core.

In particular in the case of a transmission apparatus 1 with a structure as in FIG. 3A, 3B or 3C, an advantageous embodiment is attained. The magnetic flux, which exits there at a pole, is forwarded via the outer ring 39 in both directions and re-enters the adjacent poles of the adjacent arms. A significant advantage with these embodiments is that the pole can be practically of arbitrary length. The length of a pole is not limited to the length 31 of the shown arms 14, 15, but in principle can be of any length together with the arms 14, 15.

Since the entire magnetic flux thus does not have to be conveyed through a central region, the area of a coupling gap 6 can be scaled arbitrarily over the length thereof.

The magnetic circle is preferably closed in the cross-sectional area and thus perpendicular to the direction of movement of the two components relative to one another. Due to the use of a plurality of arms with alternately oriented poles, a short magnetic circle can be provided. The system can thus be better scaled and can also be miniaturized.

The core may have a central bore, for example so as to attach a rod or piston rod. Since the magnetic field preferably acts in radially outer regions, the rod hardly disturbs the magnetic field.

A simple structure from stamped metal sheets or the like is possible, in which identical parts are always used. Eddy currents with rapid field changes can thus be reduced, which leads to quicker switching times and lower losses. It is possible to provide special functions with certain poles. For example, a permanent magnet can be provided at each second pole in order to provide a certain basic coupling. It is also possible to arrange a number of smaller magnetic portions in succession along the movement direction. In all embodiments the outer tube, for example with cylindrical forms, can be thinner than was the case in the prior art. It is also possible however that the magnetic field generation devices 7 are provided on the outer component 2 for example. It is then possible, for example, that individual electric coils 17 are provided on radially inwardly protruding arms 14, 15.

A magnetorheological transmission device can also be provided for use of a magnetorheological fluid, such as the product "Basonetic" from BASF.

The rheological fluid can consist of a wide range of components, which individually or in combination may be: Fe, carbon steel, NdFeB (neodymium), Alnico, Samarium, cobalt, silicon, carbon fiber, stainless steel, polymers, soda-lime glass, soda-lime-silica glass, ceramic and non-magnetic metals and the like. Dimorphic magnetorheological fluids with nanotubes and/or nanowires are also possible.

The carrier fluid can consist in particular of the following components or a combination thereof: oils and preferably synthetic or non-synthetic oils, hydraulic oil, glycol, water, greases and the like.

LIST OF REFERENCE SIGNS

| | |
|---|---|
| 1 | transmission apparatus |
| 2 | component |
| 3 | component |
| 4 | central axis |
| 5 | magnetorheological medium |
| 6 | coupling gap |
| 7 | magnetic field generation device |
| 8 | magnetic field |
| 9 | friction lining |
| 10 | movement direction |
| 11 | cross section |
| 12 | spring device |
| 13 | deflection |
| 14 | arm |
| 15 | arm |
| 16 | arm |
| 17 | electric coil |
| 18 | winding |
| 19 | end |
| 20 | pole |
| 21 | pole |
| 22 | axial end |
| 23 | axial end |
| 24 | reservoir |
| 25 | pressure compensation device |
| 26 | surrounding environment |
| 27 | permanent magnet |
| 28 | groove |
| 29 | channel |
| 30 | direction of translation |
| 31 | length |
| 32 | diameter |
| 33 | seal |
| 34 | separating element |
| 35 | separating unit |
| 36 | rod |
| 36a | magnetically conductive part |
| 36b | magnetically non-conductive part |
| 37 | permanent magnet |
| 38 | core |
| 39 | ring |
| 40 | damper |
| 41 | stop |
| 42 | stop |
| 43 | spring element |
| 44 | spring element |
| 45 | free stroke |
| 46 | sensor |
| 50 | washing machine |
| 51 | controller |

| | |
|---|---|
| 52 | operating unit |
| 53 | washing drum |
| 60 | leg prosthesis |

The invention claimed is:

1. A transmission apparatus, comprising:
at least two components to be coupled and configured to move in translation along a central axis relative to one another, a first of said at least two components being a piston cylinder and a second of said at least two components being a piston head, said piston head and said piston cylinder forming at least one coupling gap between a radially outer wall of said piston head and an inner wall of said piston cylinder;
a magnetorheological medium disposed in said coupling gap;
said coupling gap being outwardly sealed in a direction of translation at a first end and a second end of said piston head to retain said magnetorheological medium in said coupling gap as a controllable friction lining, irrespective of a coupling between said at least two components, and to influence the coupling via shear forces between said at least two components, in accordance with a magnetic field applied in said coupling gap;
said cylinder head being formed with a plurality of radially extending arms;
magnetic field generation devices for generating a magnetic field in said coupling gap to thereby influence a coupling between said at least two components;
said magnetic field generation devices each including an electric coil with at least one winding on at least some of said arms, each said winding extending completely next to the central axis and at a spacing distance from the central axis, said magnetic field generation devices having mutually different magnetic poles at mutually adjacent ends of adjacent arms of at least one of said components, with each of said arms that carry an electric coil having a magnetization with a magnetic South pole and a magnetic North pole, respectively, mutually adjacent said arms having an opposite magnetization in a radial direction, and said ends of said arms having alternating magnetic South and North poles in a circumferential direction; and
a reservoir with magnetorheological medium connected to communicate with said coupling gap.

2. The transmission apparatus according to claim 1, wherein said at least two components include an inner component and an outer component disposed to at least partially surround said inner component.

3. The transmission apparatus according to claim 1, which comprises a spring device disposed to generate a counter-force when said two components are deflected in at least one direction.

4. The transmission apparatus according to claim 1, wherein one or said components is received on a coupling part and is movable via a free stroke relative to the coupling part.

5. The transmission apparatus according to claim 1, wherein said coupling gap is one of a plurality of coupling gaps distributed over a periphery of the component.

6. The transmission apparatus according to claim 1, wherein said magnetorheological medium in said coupling gap is subject, in a rest state, substantially to ambient pressure or slight overpressure.

7. The transmission apparatus according to claim 1, wherein said coupling gap containing at least one pressure compensation device.

8. The transmission apparatus according to claim 7, wherein said pressure compensation device comprises at least one groove formed along said coupling gap.

9. The transmission apparatus according to claim 7, wherein said pressure compensation device comprises at least one channel formed to connect one end of said coupling gap to another end of said coupling gap.

10. The transmission apparatus according to claim 1, wherein said at least one magnetic field generation device includes a permanent magnet.

11. The transmission apparatus according to claim 10, wherein a magnetic field of said permanent magnet is influenced via an associated electric coil.

12. The transmission apparatus according to claim 11, wherein the magnetic field of said permanent magnet is configured to vary continuously and/or to be changed permanently via short pulses of the electric coil.

13. The transmission apparatus according to claim 2, wherein a length of said inner component is greater than a diameter of said inner component (2).

14. The transmission apparatus according to claim 1, which further comprises elements selected from the group consisting of seals, scraper rings, and guides enabling a linear relative movement of said at least two components.

15. The transmission apparatus according to claim 1, wherein said magnetorheological medium is a suspension of ferromagnetic particles in a medium selected from the group consisting of oil, glycol, and grease.

16. The transmission apparatus according to claim 15, wherein said medium contains stabilizers.

* * * * *